July 29, 1952  P. D. TILTON  2,604,644
CORNER REFLECTOR FLOAT MARKER
Filed Sept. 19, 1945  6 Sheets-Sheet 1

INVENTOR
PETER D. TILTON
BY
*Ralph L. Chappell*
ATTORNEY

July 29, 1952
P. D. TILTON
2,604,644
CORNER REFLECTOR FLOAT MARKER
Filed Sept. 19, 1945
6 Sheets—Sheet 2
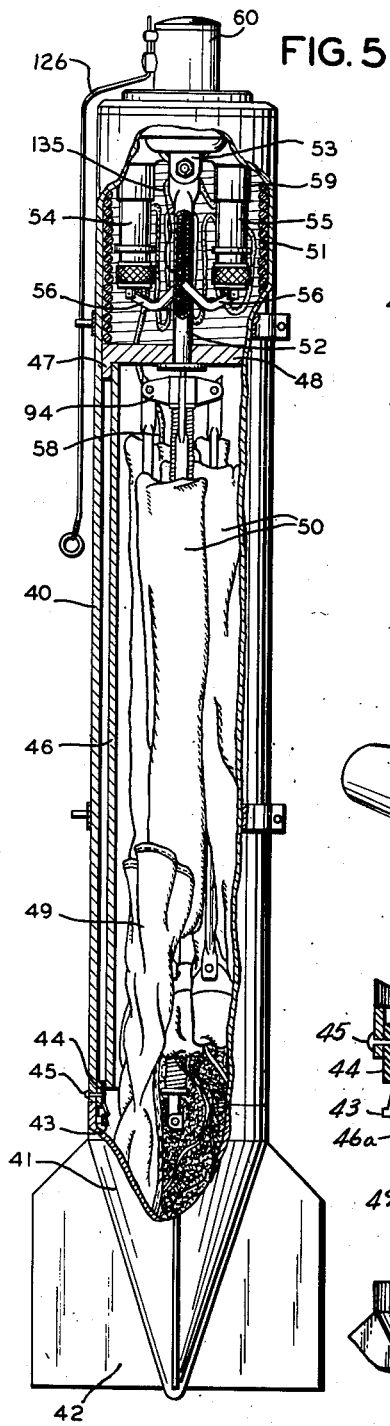
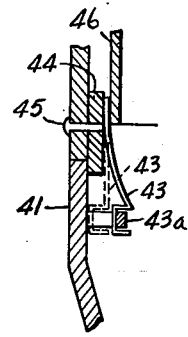
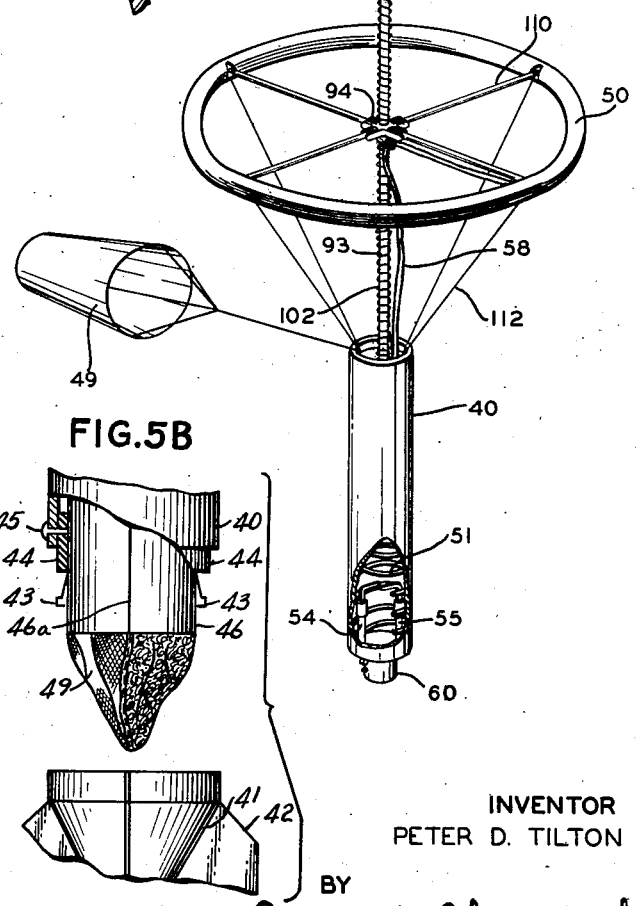
INVENTOR
PETER D. TILTON
BY
Ralph L Chappell
ATTORNEY

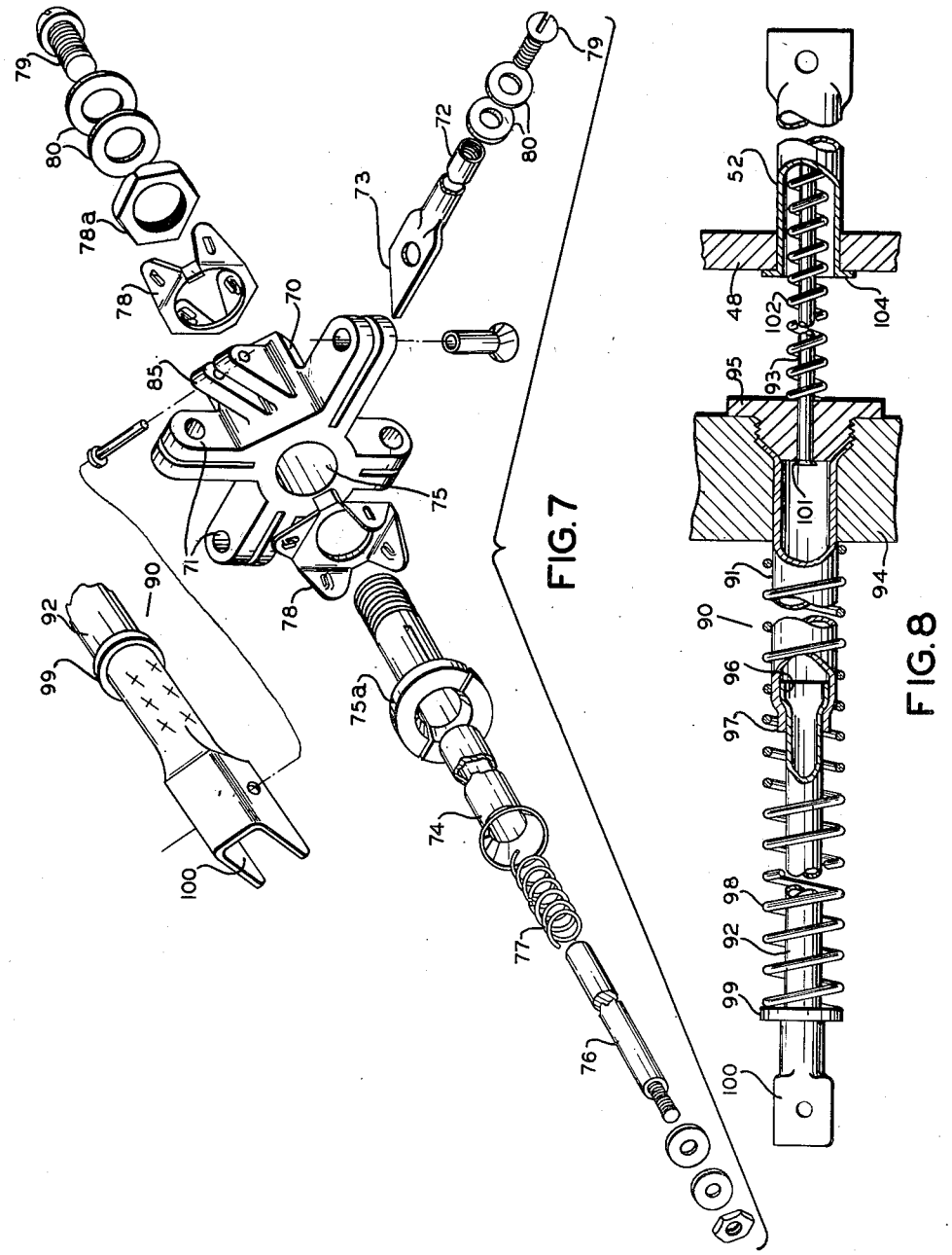

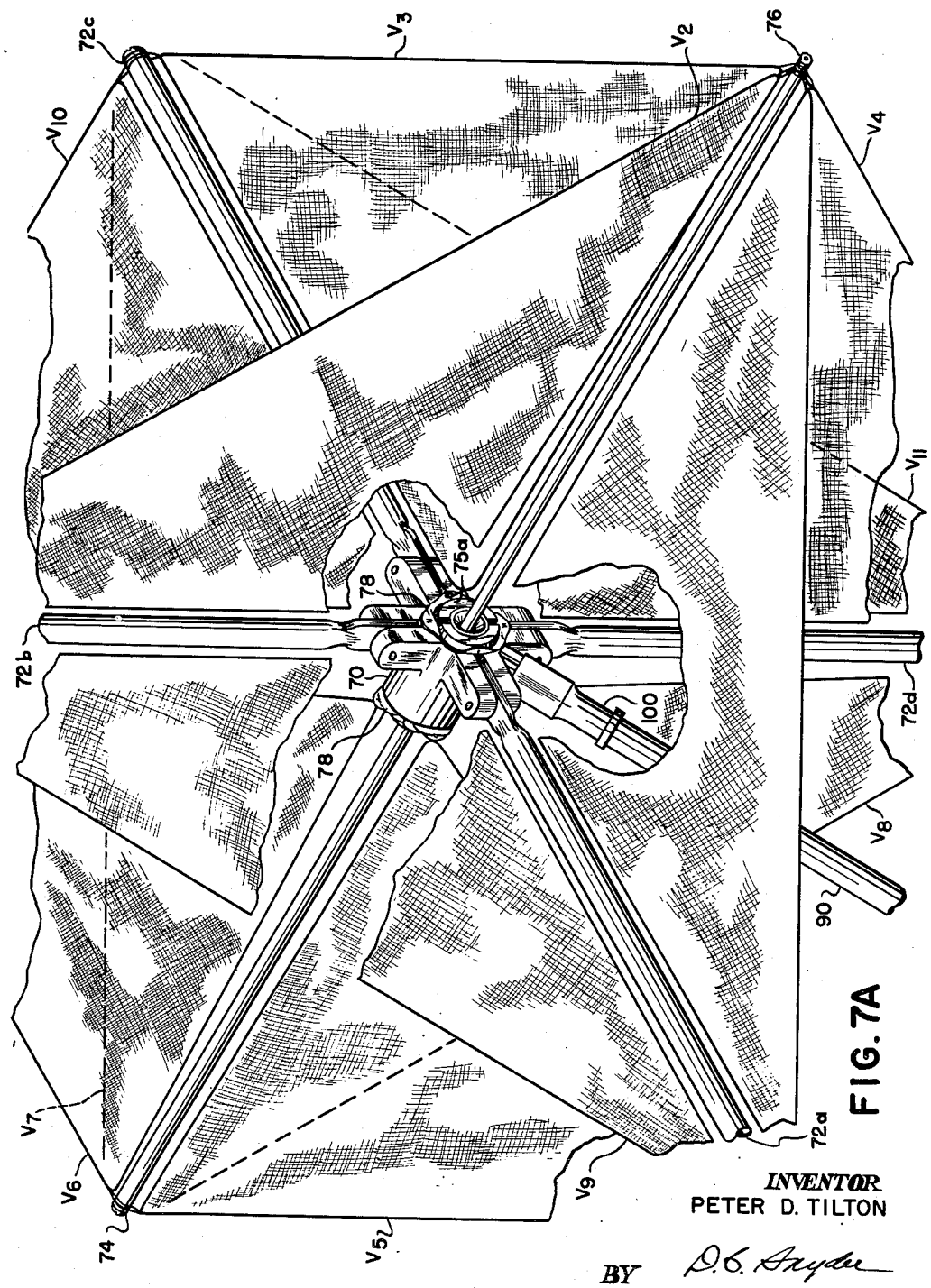

INVENTOR
PETER D. TILTON

BY
ATTORNEY

July 29, 1952

P. D. TILTON 2,604,644

CORNER REFLECTOR FLOAT MARKER

Filed Sept. 19, 1945

INVENTOR
PETER D. TILTON

BY
Ralph L. Chappell
ATTORNEY

Patented July 29, 1952

2,604,644

UNITED STATES PATENT OFFICE 2,604,644

CORNER REFLECTOR FLOAT MARKER

Peter D. Tilton, Cambridge, Mass., assignor, by mesne assignments, to the United States of America as represented by the Secretary of the Navy Application September 19, 1945, Serial No. 617,373

20 Claims. (Cl. 9—8)

This invention relates to a device for marking an object or location in order that it may more readily be found by persons seeking such object or location. More specifically, the invention relates to a reflector specially adapted to reflect electromagnetic radiation of the type commonly used in connection with radio echo detection sets.

In general, this invention relates to a reflector comprising a group of corner reflectors or trihedral reflecting units so assembled as to provide as large a coverage as possible consistent with rigid construction and compact size. A corner reflector is a device for returning transmitted radio microwaves to the receiver of a radio echo detection set, and consists of three mutually perpendicular intersecting electrically conductive vanes. A complete reflector as contemplated by this invention consists of eleven vanes so assembled as to present a cluster of six trihedral reflecting units or corners. Various shapes of reflecting vanes may be used, the preferred shape being that of an isosceles triangle.

An object of this invention is to provide a novel, compact, lightweight collapsible reflector which may be erected by a person in distress and which when erected presents a group of trihedral reflecting units specially adapted to reflect electromagnetic radiation to the source from which such radiation emanates.

Another object of this invention is to provide a reflector of the class described in which the reflecting surfaces are so oriented as to cause reflection of radio microwaves irrespective of the lateral or vertical orientation of the source of said microwaves with respect to the reflector, within the range of the device.

Still another object of this invention is to provide a reflector of the class described which may be dropped into the sea and which is adapted to be self-positioning and self-erecting.

A particular object of this invention is to provide a maritime buoy employing the principles of corner reflection for use as a marking device.

A more particular object of this invention is to provide a collapsible maritime buoy of the class indicated consisting of trihedral reflecting units having a pneumatically expansible float and provided with means operable upon contact with the surface of the water for causing inflation of said float and erection of said buoy.

Further objects and advantages of this invention as well as its construction, arrangement, and operation, will be apparent from the following description and claims in connection with the accompanying drawing, in which:

Fig. 5 is a detail view partially in section illustrating the arrangement of various elements of the invention in a suitable casing as contemplated by this invention.

Fig. 5A is a detailed view of the latch assembly of Fig. 5.

Fig. 5B is a fragmentary view of the casing of Fig. 5 with the buoy in a partially ejected position.

Fig. 6 is a perspective view of the self-erecting, self-positioning maritime buoy of Fig. 5 in a fully erected position.

Fig. 7 is an exploded view of the support mechanism used to orient the reflecting surfaces of Fig. 6 so as to form trihedral reflecting units.

Fig. 7A is a detailed view partially broken away of the reflector assembly of Fig. 6 in a fully erected position.

Fig. 8 is a partially sectional view of the mast assembly of the embodiment of the invention shown in Fig. 6.

In order to provide a collapsible frame construction which may be folded into a compact package, there is shown in Figs. 1 through 4 one form of the invention in which a plurality of arms are pivotally mounted upon a suitable hub. Eleven triangular collapsible reflecting vanes, as disclosed in the application of Emmett L. Hudspeth and John P. Nash entitled "Collapsible Corner Reflector" Serial No. 620,986, filed October 18, 1945, now Patent No. 2,534,716 are mounted on suitable arms and to the hub in order to present a cluster of six trihedral reflecting units in which the three reflecting vanes of each unit are mutually perpendicular when the reflector is opened into an erected position.

Figure 1:
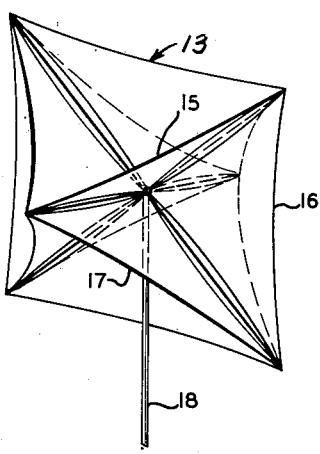
Fig. 1 is a perspective view of one form of the invention specially adapted for use in connection with life rafts or the like, in a fully erected position.

Fig. 1 is a perspective view of a fully erected reflector 13 of the class above described, one of the six trihedral reflecting units being composed of the mutually perpendicular surfaces 15, 16 and 17. A mast 18 is provided to support the reflector.

Figure 3:
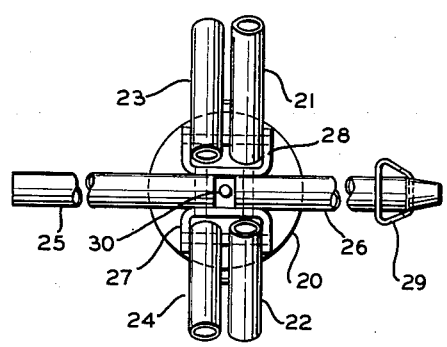
Fig. 3 is a top view of the hub and arms of one form of this invention.
Figure 2:
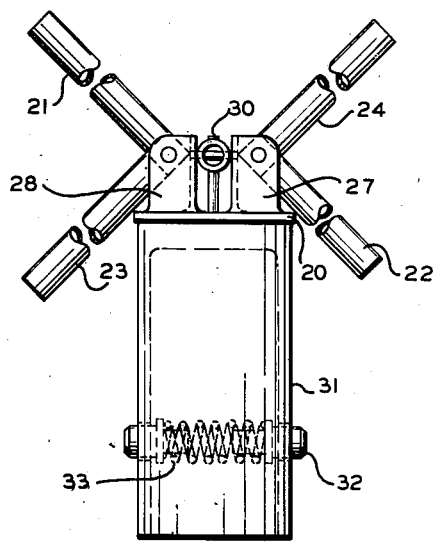
Fig. 2 is a front view of the hub and pivotally mounted arms for supporting the reflecting surfaces shown in Fig. 1.
Figure 4:
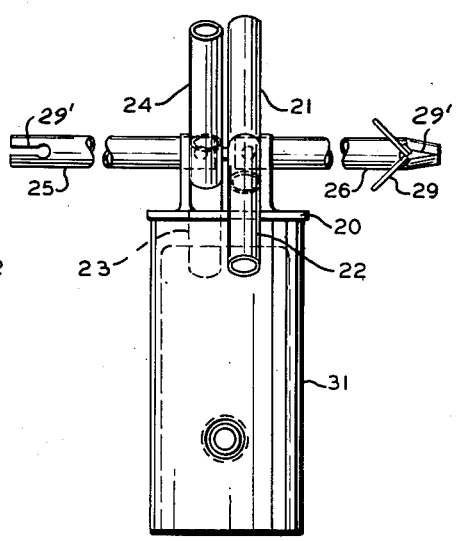
Fig. 4 is a side view of the invention shown in Fig. 2.

Referring to Figs. 2 through 4 there is shown a hub 20 having means for pivotally mounting six supporting arms 21, 22, 23, 24, 25 and 26 to the upper portion thereof, comprising two U-shaped brackets 27 and 28 having the open ends thereof facing outwardly and being so disposed with respect to each other as to allow arms 25 and 26 to be pivotally mounted to the bases of brackets 27 and 28 and disposed therebetween. As shown in Fig. 3 all of the arms are preferably formed of aluminum tubing, arms 21 and 23 being pivotally mounted to bracket 28 and arms 22 and 24 being mounted to bracket 27. Arms 25 and 26 are pivotally mounted to the bases of brackets 27 and 28, being disposed therebetween. It will readily be understood that arms 21, 22 and 23 and 24 will lie in two parallel planes which due to the relatively small diameter of the arms are substantially a common plane, while arms 25 and 26 lie in a common plane perpendicular to the planes including arms 21, 22, 23 and 24, when the arms are opened into an extended position as shown in Figs. 2 and 4. In this position, arms 21 and 23 will include an angle of approximately 90° therebetween as will arms 22 and 24. Arms 25 and 26 are coaxial and will include an angle of 90° between the axis of said last-mentioned pair of arms and the planes including the remaining arms when extended to a fully open position. All of the aforementioned arms are of nearly equal length and are provided with clips at the outer end thereof for attaching the outer apices of triangular reflecting surfaces thereto. These clips are illustrated in Fig. 4 as clip 29 at the outer end of arm 26. Arm 25 is shown without a clip 29 to illustrate one preferred manner of attaching clips 29. A slot 29' is provided at the end of each of the arms into which the clip 29 is inserted. The slot 29' is then closed by bending the tip of the arm as shown at the end of arm 26. The inner apex of each reflecting surface is secured to a peg 30 mounted on hub 20. There is thus provided a plurality of supporting arms pivotally mounted on hub 20 which present a multiplicity of outwtrdly projecting apices equidistant from a common center and equally spaced from each other in triangular arrangement, upon which triangular reflecting surfaces may be fastened. When eleven similar triangular reflecting vanes as disclosed in the heretofore mentioned patent application Serial No. 620,986 now Patent No. 2,534,716 are placed in the spaces defined by the outwardly extending arms and are fastened at their inner extremities to peg 30 and at their outer extremity to clips 29, there is formed a group of six similar trihedral units, each unit comprising three mutually perpendicular surfaces. An extension 31 is provided on hub 20 in order that the hub may be mounted on a suitable mast, such as, for example, the hollow oar commonly used in connection with life rafts. Retaining means in the form of a pair of pegs 32 are provided on extension 31, said pegs being slidable transverse to extension 31 and yieldably held in extended position by means of a spring 33 as shown in Fig. 2.

Figs. 5 through 10 illustrate a second embodiment of the invention in the form of a maritime buoy specially adapted to be dropped from aircraft, the deck of a vessel, or the like, and which is self-erecting and self-positioning upon the surface of the water.

Fig. 5 is a detail view partially in section illustrating the arrangement of various elements of the invention in a suitable cylindrical casing 40 preferably formed of a plastic or impregnated chipboard material. A tail cone 41, fitted with fins 42, is detachably secured to the tail of cylinder 40 by means of suitable similar latches 43 fastened through a stop ring 44 to casing 40 by any suitable means such as a rivet 45. As shown in greater detail in Fig. 5A, latches 43 engage loops 43a which are secured to tail cone 41 by suitable fastening means. Latches 43 are made of resilient material so that the hook-like end portions of latches 43 may be moved out of engagement with loops 43a by inner shell 46. The dashed lines in Fig. 5A indicate the disengaged position of latch 43. The inner shell 46, formed of two semi-cylindrical sections is slidably mounted within casing 40, being spaced from casing 40 by stop ring 44 and a flange 47 of a piston 48. Mounted within shell 46 is a collapsible reflector similar to that described in connection with Figs. 1 through 4, a sea anchor 49, and an inflatable float 50. Mounted in the nose section of casing 40 is a preloaded ejector spring 51, a hangar tube 52, which cooperates with a latch bracket 53 for normally retaining piston 48 in a fixed position within casing 40, a pair of gas cylinders 54 and 55 together with suitable levers 56, a lanyard 135 for actuating said levers to release compressed gas such as carbon dioxide from cylinders 54 and 55, and a hose connection 58 for leading said gas from a manifold 59 to float 50. An impact release mechanism 60 including a time delay device is fastened to the nose of cylinder 40 in order to release latch bracket 53 when the reflector strikes the surface of the water. An arming wire 126 is provided to prevent premature release of the reflector from casing 40 due to accidental shock. Fig. 5B shows the inner shell 46, split along line 46a, partially ejected from casing 40 under the action of the ejector spring 51. In moving outwardly, inner shell 46 depresses latches 43 thus releasing tail cone 41.

Figure 7B:
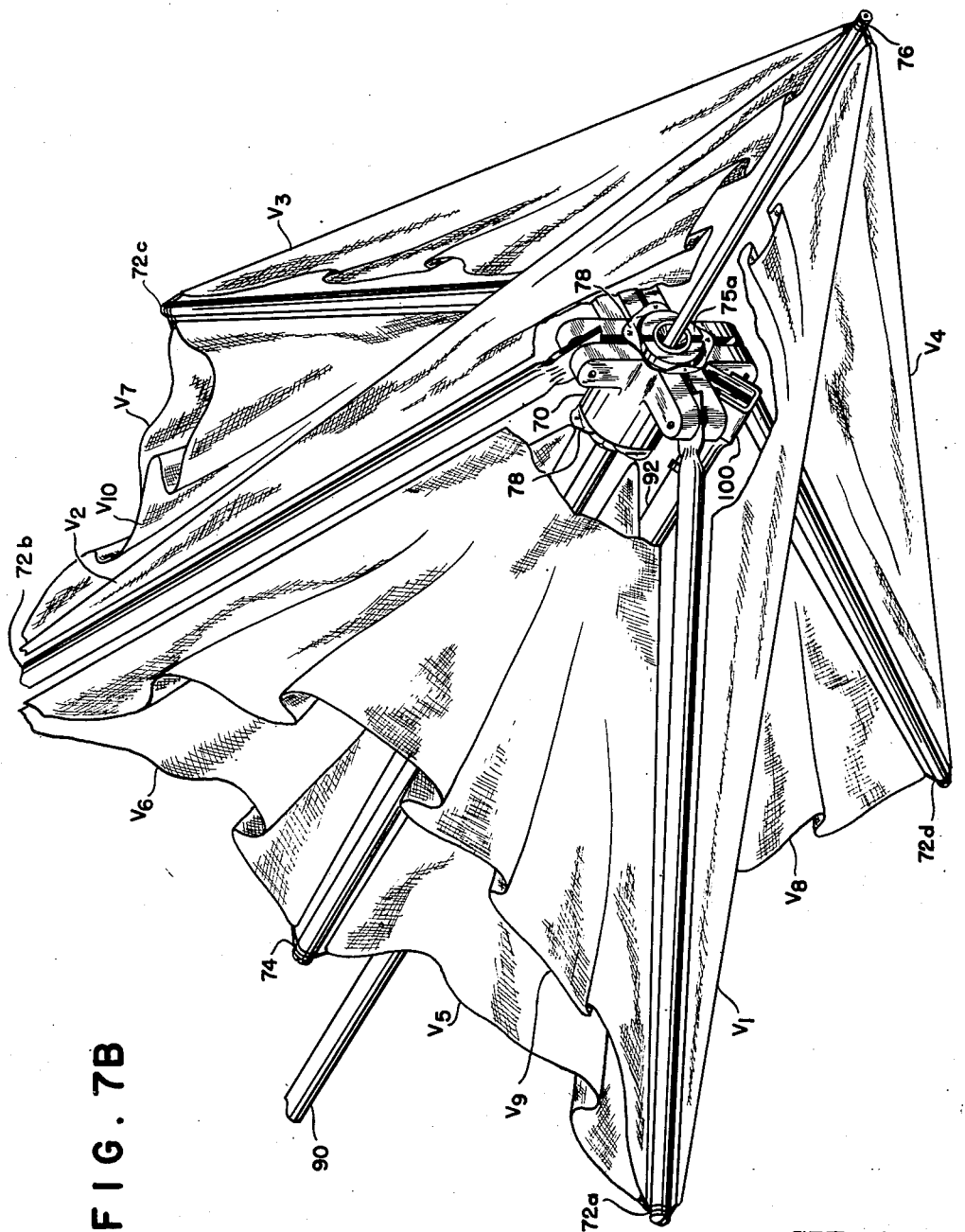
Fig. 7B is a detailed view partially broken away of the reflector assembly of Fig. 6 in a partially collapsed position.

Fig. 6 is a perspective view of the maritime buoy of Fig. 5 in a fully erected position. Operation of the erecting mechanism will be fully explained in connection with Figs. 7 through 10. Figs. 7, 7A and 7B describe the operation of reflector assembly 140 of Fig. 6.

Fig. 7 is an exploded view of the assembly of arms used for suspending the eleven reflecting vanes forming trihedral reflecting units as contemplated by this invention. Fig. 7A is an isometric view of the reflector assembly 140 in a fully erected position. Fig. 7B is a second isometric view of reflector assembly 140 taken at the same angle as Fig. 7A but showing the reflector assembly 140 in a partially collapsed position. Referring to Figs. 7, 7A and 7B, there is shown a hub 70 provided with four mutually perpendicular ears 71 for pivotally mounting four arms 72 of similar length to said hub. These four arms will hereinafter be identified as arms 72a, 72b, 72c and 72d respectively. Mechanical stops 73 allow the arms to pivot outwardly from the axis of hub 70 so as to include an angle of 90° between said arms and the axis of said hub when fully erected. It will readily be understood that the four arms 72 will be mutually perpendicular and lie in a common plane perpendicular to the axis of said hub when extended into a fully open position. A fifth tubular arm 74 is mounted on hub 70, extending through a bore 75 therein, being retained in a fixed position with respect to said hub by any suitable means such as a collet 75a. It will readily be understood from Fig. 7 that arm 74 is mounted to hub 70 in such manner as to be oriented perpendicular to a common plane in which the four ears 71 lie. When the arms pivoted to ears 71 are fully extended as shown in Fig. 7A, they will therefore be mutually perpendicular and lie in a common plane perpendicular to the axis of arm 74. A sixth support arm 76 telescopes inside of arm 74, being coaxial with arm 74 and telescoping within said arm against the pressure of a spring 77. Arms 74 and 76 are of sufficient length to extend outwardly on opposite sides of hub 70 a distance equal to the length of the four pivoted arms 72a, 72b, 72c and 72d. A pair of brackets 78 disposed about the stem of collet 75a are provided for fastening the inner apices of the reflecting vanes to the hub, one of said brackets being retained adjacent hub 70 by means of collet 75a and the other by means of a suitable nut 78a. The outer apices of the reflecting vanes are secured to the outer extremities of the arms by any suitable means such as screws 79 and washers 80. As an aid in visualizing the reflector assembly 140 shown in Figs. 7A and 7B the reflecting vanes have been identified as vanes $V_1$ to $V_{11}$ inclusive. The table given below lists the arms to which the outer apices of the respective vanes are connected.

| Vane | Arm | Arm |
|---|---|---|
| $V_1$ | 76 | 72a |
| $V_2$ | 76 | 72b |
| $V_3$ | 76 | 72c |
| $V_4$ | 76 | 72d |
| $V_5$ | 74 | 72a |
| $V_6$ | 74 | 72b |
| $V_7$ | 74 | 1 72c |
| $V_8$ | 74 | 72d |
| $V_9$ | 72a | 72b |
| $V_{10}$ | 72b | 72c |
| $V_{11}$ | 72c | 72d |

1 Hidden in Fig. 7A.

A fifth ear 85 is provided on hub 70 for pivotally securing hub 70 to the upper portion 92 of a mast 90 by means of a pivot joint which permits the entire reflector to swing 90° under action of the reflector spring 77 in order to obtain the most desirable orientation of the reflector. The action of spring 77 extends arm 76, and by pulling on the binding tapes of the attached vanes $V_1$ through $V_4$ inclusive simultaneously unfolds the four pivoted arms. The outer ends of the two lowermost arms 72a and 72d are secured to mast 90 through cords 76a to cause the entire reflector to swing relative to mast 90 under the action of spring 77. Cords 76a may be secured to spring 98 or to a suitable ring which freely slides over spring 98. Spring 77 is preloaded so that a spring force is maintained at full extension to hold the reflector open. The restraining action of the binding tapes prevents spring 77 from forcing arm 76 completely out of arm 74.

Mast 90 which provides the necessary reflector support consists of three nested sections 91, 92, 93 preferably of brass or steel tubing. As shown in Fig. 8, center section 91 has a flange formed on its lower end and is fastened to a float bracket 94 by means of an externally threaded hollow nut 95. The upper section 92 of the mast telescopes into center section 91, a flanged portion 96 being provided on section 92 to coperate with a reduced portion 97 of section 91 in order to limit the outer extent of travel of section 92. A spring 98 cooperates with a washer 99 mounted on section 92 and with float bracket 94 in order to extend section 92 and support the weight of the reflector. As shown in Fig. 7 ear 85 of hub 70 is pivotally mounted to a bracket 100 formed on the end of section 92 of mast 90 in order to support the reflector. Spring 98 is preloaded so that a spring force is maintained when mast section 92 is fully extended thereby maintaining mast section 92 in a fully extended position when the device is released from casing 40. The lower mast section 93 telescopes through float bracket 94, being limited in extent of travel by means of a flange 101 on its inner end. Section 93 together with an extension spring 102 is enclosed in a hangar tube 103 serving as a receptacle for spring 102 when said spring is compressed. Spring 102 is also preloaded and operates to extend section 93 forcing float bracket 94 upwardly away from casing 40 when released. A flange 104 is provided on hangar tube 52 in order to prevent hangar tube 52 from sliding out of piston 48 under action of spring 102.

Figure 9:
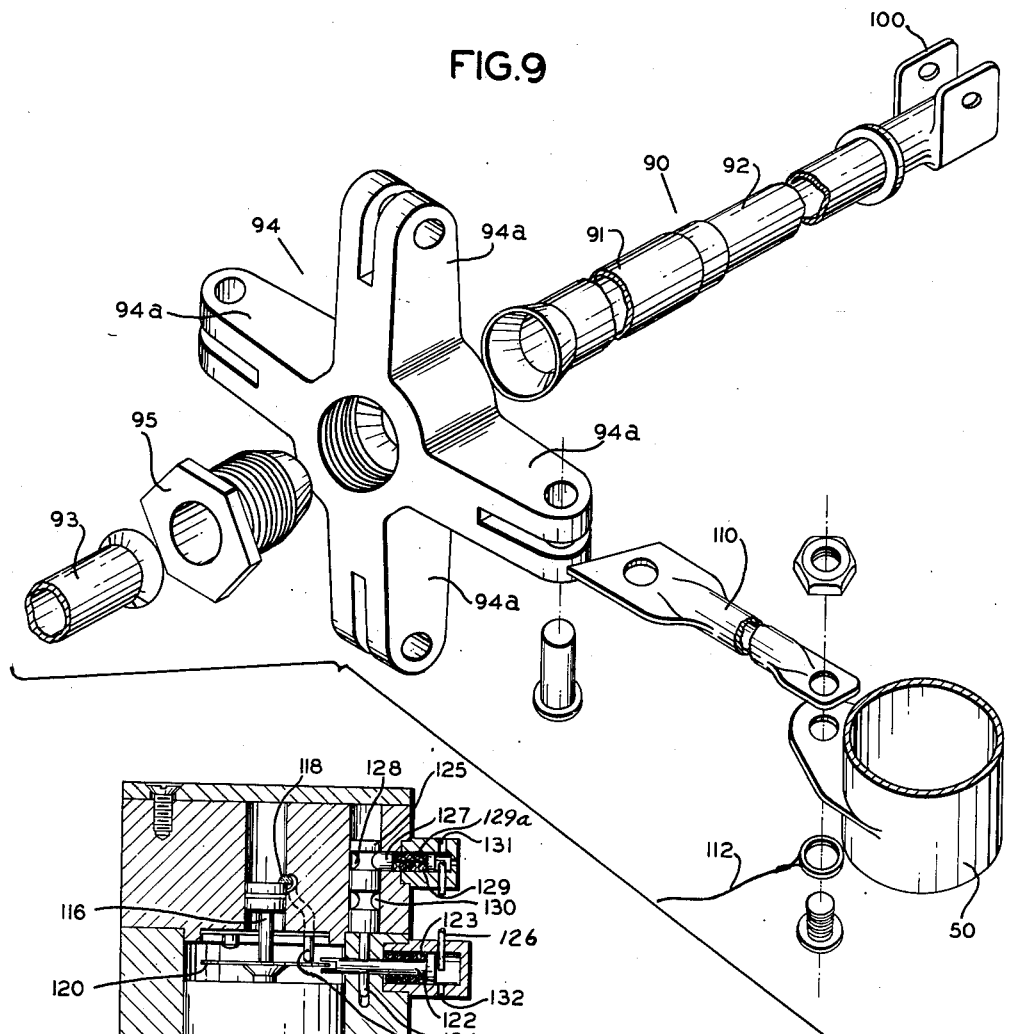
Fig. 9 is an exploded view of the float bracket assembly of the embodiment of the invention shown in Fig. 6.

Fig. 9 is an exploded view of the float bracket assembly shown in a fully erected position in Fig. 6. In Fig. 9 there is shown a toroidal inflatable flotation tube 50, mounted to the outer extremities of each of four similar arms 110 which radiate from float bracket 94, arms 110 being pivotally mounted on ears 94a of said bracket in order that they may be folded into parallelism with mast 90 extending through bracket 94 and oriented perpendicular to ears 94a. As explained in connection with Fig. 8, mast 90 extends through float bracket 94, being secured thereto by means of a hollow nut 95. Spring 98 is not shown in Fig. 9. Four similar guy wires 112 are provided in order to hang casing 40 to flotation tube 50 when the reflector is erected as shown in Fig. 6, wires 112 extending from the connection between arms 110 and float 50 to casing 40.

Figure 10:
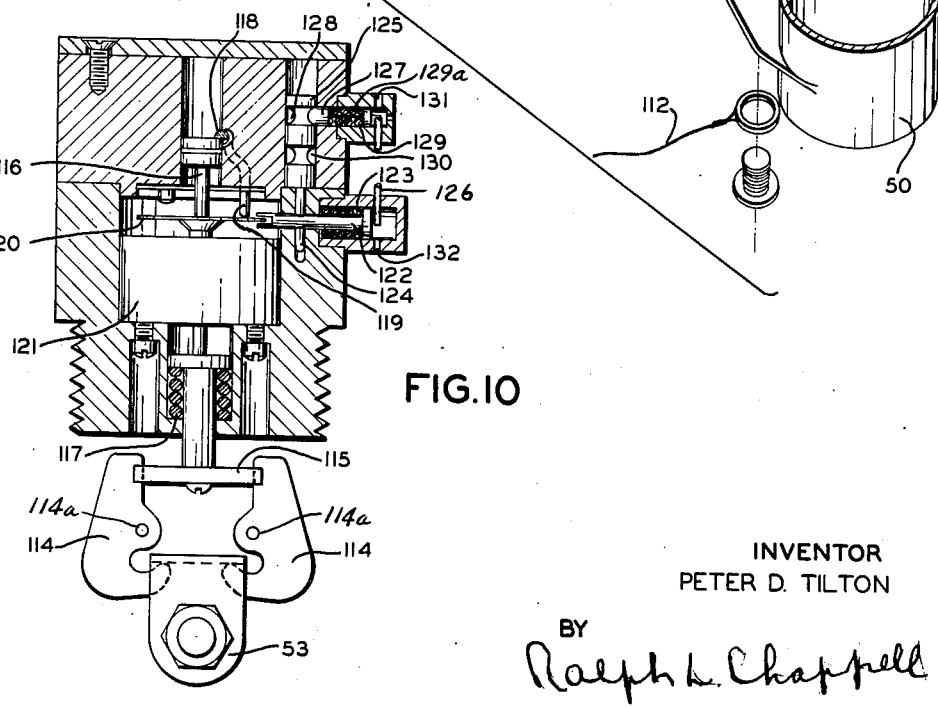
Fig. 10 is a detail view partially in section of an impact release mechanism for allowing the buoy to erect upon contact with the surface of the water.

An impact release mechanism 60 shown in Fig. 10 is provided in order to insure proper functioning of the reflector when dropped from an aircraft or the like. The total weight of casing 40 and its contents is less than an equivalent volume of water so that when the buoy is dropped into the water it will float to the surface. The weight distribution of the collapsed buoy is such that it will float in an upright position with tail cone 41 as the uppermost part. The mechanism is actuated by impact and provides a time delay of approximately forty-five seconds to allow the marker to float back to the surface and right itself before functioning. The time delay may be provided by any of the mechanical time delay units currently in use in projectiles, aerial bombs, flares and the like. However, in order that the operation of the invention may be more fully understood, the operation of a typical time delay mechanism will be briefly described. A latch bracket 53 is mounted on one end of hangar tube 52 to cooperate with a pair of similar clasps 114 which are pivotally mounted on a nose plug of casing 40. A latch key 115 and latch pin assembly 116 are restrained against the force of a latch spring 117 by a half-round cocking pin 118. Cocking pin 118 can be released only when a timing disc lever 119 drops into a slot in timing disc 120. The action of lever 119 is timed by rotation of timing disc 120 driven by a clockwork timing mechanism 121. Clockwork mechanism 121 is locked until a release pin 122 is disengaged from the slot in timing disc 120. Release pin 122 is held in place against the action of a spring 123 by a pin 124 of an impact striker 125 and also by an arming wire 126 as shown in Fig. 5. Striker 125 is restrained by a keeper pin 127 so that with arming wire 126 in place, keeper pin 127 is solidly engaged in a groove 128 in sticker 125. This solid engagement may be provided by so dimensioning spring 129 that adjacent coils are in contact when arming wire 126 is in place or by providing a member 129a which extends into contact with keeper pin 127 when arming wire 126 is in place but which is not connected to keeper pin 127. When arming wire 126 is removed, keeper pin 127 is held in place in striker groove 128 by means of a spring 129 to guard against accidental jars or shocks. A second groove 130 in striker 125 insures positive release of the timing mechanism. Arming wire 126 is threaded through drilled openings 131 and 132 and may be attached to the aircraft and automatically pulled out when the device is dropped.

In operation, upon release of the device from aircraft, arming wire 126 is withdrawn and impact striker 125 is free to function. When the missile strikes the water nose first, impact striker 125 moves downward under keeper pin 127 allowing release pin 122 to be withdrawn by spring 123. When release pin 122 is withdrawn from the slot in timing disc 120, the disc rotates at a constant speed, being driven by clockwork mechanism 121. When a predetermined time of approximately 45 seconds has elapsed, timing disc lever 119 which has a lower offset portion contacting the timing disc 120 and an upper offset portion abutting the cocking member 118 drops into the slot in the timing disc vacated by pin 122 and frees the half round member for movement within its cooperating recess. As soon as lever 119 is withdrawn from its blocking relationship with respect to cocking member 118, spring-loaded pin assembly 116 will rotate the latter element approximately 90° in a clockwise direction, as viewed in Fig. 10, so that it will present no obstacle to the further displacement of the pin assembly. Latch key member 115 has diametrically positioned slots in its peripheral surface for receiving the upper extremities of clasps 114. Movement of latch pin assemblies 116 withdraws latch key or spacer 115 from between these clasps. Clasps 114 are pivoted at points 114a and each is provided with a finger at the lower end thereof which extends into holding engagement with latch bracket 52. It should be noted at this point that these clasps are normally subject to a force from spring ejector 51 acting through hanger 52 and bracket 53 tending to rotate them in opposite directions but such action is inhibited due to the presence of latch key spacer 115. Thus, upon the withdrawal of spacer 115, clasps 114 rotate about their respective pivot points 114a thereby removing their lower fingers from holding engagement with latch bracket 53 and allowing the ejector mechanism to commence operation.

With the opening of clasps 114, the force of ejector spring 51 forces the contents of casing 40 out of the case into an erected position as shown in Fig. 6. Movement of split shell 46 trips tail cone latches 43 so that tail cone 42 is thrown off, enabling the reflector and float to be ejected. As the ejection spring approaches the end of its stroke a lanyard 135 attached to hangar tube 52 pulls the carbon dioxide cylinder actuating levers 56 releasing the gas which passes through manifold 59 and gas tube 58 to toroid 50. In the meantime, motion of ejector spring 51 forces piston 48 against stop ring 44 allowing split shell 46 to fall away. Action of lower mast spring 102 forces float bracket 94 up away from casing 40, this action together with the inflation of float 50 resulting in the unfolding of float arms 110 whose tips are restrained by guy wires 112 having the opposite ends thereof fastened to casing 40. Mast spring 93 extends upper mast section 92 together with hub 70 pivotally mounted thereon. As heretofore explained in connection with Fig. 7 reflector spring 77 extends arm 76, and by pulling on the binding tapes of the vanes attached to the six support arms unfolds the four pivot arms causing the reflector to be fully extended.

While two embodiments of the invention have been disclosed and described in detail, it is to be understood that various modifications and changes may be made in this invention without departing from the spirit and scope thereof as set forth in the appended claims.

What is claimed is:

1. A maritime buoy for reflecting electromagnetic radiation comprising a casing, a collapsible corner reflector and inflatable float disposed within said casing, means for normally retaining said reflector and said float within said casing, means for inflating said float disposed within said casing, means for ejecting said reflector and said float from said casing, means operable in response to a predetermined degree of travel of said ejector means for causing inflation of said float, and means responsive to impact for releasing said reflector and float from said retaining means.

2. A self-erecting, self-positioning maritime buoy for reflecting electromagnetic radiation comprising a casing having a detachable tail section, a collapsible corner reflector and inflatable float disposed within said casing, means for inflating said float disposed within said casing, means for ejecting said float and said reflector from said casing, means for normally retaining said float and reflector within said casing, means for releasing said tail section from said casing, means responsive to impact for releasing said reflector and float from said retaining means, and means responsive to a predetermined amount of travel of said ejector means for actuating said inflation means.

3. A maritime buoy for reflecting electromagnetic radiation comprising a casing having a detachable tail section, a collapsible corner reflector and inflatable float disposed within said casing, means for inflating said float, means for ejecting said float and reflector from said casing, means for normally retaining said float and reflector within said casing, means for releasing said tail section from said casing, means responsive to impact for releasing said float and reflector from said retaining means, means responsive to a predetermined amount of travel of said ejection means for actuating said inflation means, and means for suspending said casing from said float.

4. A target for electromagnetic energy comprising a substantially tubular casing having an open and a closed end, a collapsible reflector and a reflector supporting means disposed within said casing, attaching means for securing said supporting means to said casing, said attaching means being movable from a position adjacent said closed end of said casing to a position adjacent said open end of said casing, ejecting means urging said attaching means toward said open end, and releasable retaining means retaining said reflector and said supporting means within said casing and retaining said attaching means adjacent said closed end against the action of said ejecting means.

5. A target for electromagnetic energy comprising a substantially tubular casing having an open end and a closed end, a collapsible reflector and a reflector supporting means disposed within said casing, attaching means securing said supporting means to said casing, said attaching means being movable from a position adjacent said closed end of said casing to a position adjacent the open end of said casing, ejecting means urging said attaching means toward said open end, first releasable retaining means retaining said attaching means adjacent said closed end against the action of said ejecting means, second releasable retaining means for retaining said reflector and said reflector supporting means within said casing.

6. A reflector as in claim 5 wherein said reflector supporting means comprises an extensible mast and a float secured to said mast intermediate the ends thereof.

7. A reflector as in claim 5 wherein said second releasable retaining means is caused to be released by the movement of said attaching means toward said open end of said casing.

8. A maritime buoy for reflecting electromagnetic radiation comprising a substantially tubular casing having an open and a closed end, a self-erecting collapsible reflector and a reflector supporting means disposed within said casing, said reflector supporting means including an extensible mast and a float secured to said mast intermediate the ends thereof, attaching means securing said reflector supporting means to said casing, said attaching means being movable from a position adjacent the closed end of said casing to a position adjacent the open end of said casing, ejecting means urging said attaching means toward said open end, first releasable retaining means retaining said attaching means adjacent said closed end against the action of said ejecting means, second releasable retaining means for retaining said reflector and said reflector supporting means within said casing, said second releasable retaining means being caused to be released by movement of said attaching means toward said open end of said casing.

9. Apparatus in claim 8 wherein said buoy further comprises inertia-operated delay releasing means for releasing said first retaining means a predetermined time after actuation of said releasing means.

10. A collapsible reflector for electromagnetic radiation comprising a hub, a plurality of support arms pivotally mounted on said hub, a second plurality of arms rigidly secured to said hub, said arms, when extended, presenting a multiplicity of outwardly projecting apices equidistant from a common center and equally spaced from each other in a triangular arrangement, reflecting units mounted on said arms and said hub within the respective spaces defined by said apices for forming a corner type reflector, one of said second plurality of arms being adjustable in length, whereby said reflector may assume a collapsed position upon retraction of said adjustable arm and is urged into an erected position upon extension of said adjustable arm and a mast secured to said hub and means for rotating said reflector as a unit relative to said mast whereby said second plurality of arms are moved from a position parallel to said mast when said reflector is collapsed to a position perpendicular thereto when said reflector is erected.

11. A self-erecting collapsible reflector for electromagnetic radiation comprising a hub, a plurality of support arms pivotally mounted on said hub, a second plurality of arms rigidly secured to said hub, said arms, when extended, presenting a multiplicity of outwardly projecting apices equidistant from a common center and equally spaced from each other in a triangular arrangement, reflecting units mounted on said arms and said hub within the respective spaces defined by said apices for forming a corner type reflector, one of said second plurality of arms being extensible and provided with a resilient means urging said arm into an extended position, said resilient means thereby tending to maintain said reflector in an erected position and a mast secured to said hub and means for moving the reflector as a unit relative to said mast whereby said second plurailty of arms are rotated from a first position parallel to said mast when said reflector is collapsed to a second position perpendicular to said mast when said reflector is erected, said means comprising cord connections between the mast and a pair of arms pivotally mounted on said hub.

12. A collapsible reflector for electromagnetic radiation comprising a first arm having first and second telescoping sections, resilient means tending to extend said sections to increase the length of said first arm, four arms pivotally secured to said first section at a substantially common point on said first section, each of said four pivotally mounted arms being movable from a collapsed position substantially parallel to said first section to an extended position substantially perpendicular to said first section and substantially perpendicular to the others of said pivotally mounted arms, reflector units fastened to the outer extremities of said arms and to said point of pivotal support of said four pivotally mounted arms, said units being mounted within the respective triangular spaces defined by said outer extremities of said arms to form a corner type reflector, selected ones of said reflecting units acting to urge said pivotally mounted arms into said extended position upon extension of said first arm, a mast pivotally secured to said hub and means cooperating with said mast and said reflector whereby said first arm is moved from a position parallel to said mast to a position perpendicular thereto in response to the erection of the reflector.

13. A collapsible reflector for electromagnetic radiation comprising a hub, a first arm rigidly secured at a first end thereof to said hub, second, third, fourth, and fifth arms pivotally mounted on said hub, each of said second, third, fourth, and fifth arms being movable from a collapsed position substantially parallel to said first arm to an extended position substantially perpendicular to said first arm and the others of said second, third, fourth and fifth arms, a sixth arm telescopically positioned within said hub and said first end of said first arm, resilient means urging said sixth arm out of said first arm in the direction away from a second end of said first arm, reflector units fastened to the outer extremities of said arms and to said hub, said units being mounted within the respective triangular spaces defined by the outer extremities of said arms to form a corner type reflector, the reflecting units attached to said sixth arm and said second, third, fourth and fifth arms acting to urge said second, third, fourth and fifth arms into said extended position upon extension of said sixth arm, a mast pivotally secured to said hub and means connecting said mast to said second and third arms whereby said reflector in response to its erection assumes a rotated position with its first arm perpendicular to said mast.

14. A target for electromagnetic energy comprising, a casing, a reflector and reflector supporting means disposed within said casing, means for ejecting said reflector and said supporting means from said casing, releasable retaining means retaining said reflector and said supporting means within said casing against the action of said ejecting means, and means operative a predetermined time after the actuation thereof for releasing said retaining means.

15. A droppable target for electromagnetic energy comprising, a casing, a reflector and reflector supporting means disposed within said casing, means for ejecting said reflector and said supporting means from said casing, releasable retaining means retaining said reflector and said supporting means within said casing against the action of said ejecting means and inertia responsive means operative a predetermined time after the actuation thereof for releasing said retaining means.

16. A droppable target for electromagnetic energy comprising, a casing open at one end thereof, a closure for said open end of said casing, a plurality of depressible latches securing said closure to said casing, a reflector and a reflector supporting means disposed within said casing, means for ejecting said reflector and said supporting means from said casing, releasable retaining means retaining said reflector and said supporting means within said casing against the action of said ejecting means, and means operative to release said retaining means, said ejecting means after a predetermined degree of travel thereof acting to depress said latches thereby to release said closure.

17. A maritime buoy as in claim 8 wherein said float is inflatable, said buoy further comprising means operable in response to a predetermined degree of travel of said attaching means for inflating said float.

18. A maritime buoy for reflecting electromagnetic radiation comprising, a substantially tubular casing having an open and a closed end, a self-erecting collapsible reflector and a reflector supporting means including an extensible mast and an inflatable float secured to said mast, means for ejecting said reflector and said reflector supporting means from said casing, releasable retaining means retaining said reflector and said reflector supporting means within said casing against the action of said ejecting means, a closure releasably secured to the open end of said casing, said closure being released by a first predetermined degree of travel of said ejector means, and means responsive to a second predetermined degree of travel of said ejecting means for inflating said float.

19. A self-erecting reflector as in claim 11 wherein said pivotally mounted support arms and said mast are coplanar when the reflector is erected with the latter element midway between a pair of said pivotally mounted support arms.

20. A collapsible reflector as defined in claim 13 wherein said mast is in the plane of said second and third arms and midway between two of said pivotally mounted arms when said reflector occupies its rotated position.

PETER D. TILTON.

REFERENCES CITED

The following references are of record in the file of this patent:

UNITED STATES PATENTS

| Number | Name | Date |
| --- | --- | --- |
| D. 143,998 | Shreeve et al. | Feb. 26, 1946 |
| 770,626 | Bell | Sept. 20, 1904 |
| 1,384,014 | Fessenden | July 5, 1921 |
| 1,556,725 | Shallcross | Oct. 13, 1925 |
| 1,684,262 | Clinker | Sept. 11, 1928 |
| 1,813,874 | Eskilson | July 7, 1931 |
| 2,042,391 | Ewen | June 2, 1936 |
| 2,380,587 | Fenton | July 31, 1945 |
| 2,450,417 | Bossi | Oct. 5, 1948 |
| 2,534,710 | Golian et al. | Dec. 19, 1950 |